(12) United States Patent
Ludwig, IV et al.

(10) Patent No.: US 11,126,791 B2
(45) Date of Patent: Sep. 21, 2021

(54) IN-APPLICATION EXAMPLE LIBRARY

(71) Applicant: MICROSOFT TECHNOLOGY LICENSING, LLC, Redmond, WA (US)

(72) Inventors: David Boyd Ludwig, IV, Seattle, WA (US); Aldo Raul Torres, Everett, WA (US); Patrick William Volum, Seattle, WA (US); Tong Jiang, Seattle, WA (US); Christopher Blanton Smith, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/797,913

(22) Filed: Feb. 21, 2020

(65) Prior Publication Data

US 2021/0264101 A1    Aug. 26, 2021

(51) Int. Cl.
*G06F 17/00* (2019.01)
*G06F 40/18* (2020.01)
*G06F 3/0482* (2013.01)
*G06F 40/106* (2020.01)

(52) U.S. Cl.
CPC ............ *G06F 40/18* (2020.01); *G06F 3/0482* (2013.01); *G06F 40/106* (2020.01)

(58) Field of Classification Search
CPC ....... G06F 40/18; G06F 40/106; G06F 3/0482
See application file for complete search history.

(56) References Cited

U.S. PATENT DOCUMENTS

| | | | |
|---|---|---|---|
| 5,603,021 A | 2/1997 | Spencer et al. | |
| 7,634,730 B2 | 12/2009 | Weber et al. | |
| 8,250,461 B2 | 8/2012 | Bauchot | |
| 9,256,590 B2 | 2/2016 | Otero et al. | |
| 9,286,285 B1 | 3/2016 | Vagell et al. | |
| 9,652,446 B2 | 5/2017 | Creason et al. | |
| 2006/0069675 A1* | 3/2006 | Ogilvie | G06F 16/951 |
| 2006/0095833 A1* | 5/2006 | Orchard | G06F 40/18 715/209 |
| 2006/0129932 A1* | 6/2006 | Weber | G06F 40/18 715/705 |

(Continued)

FOREIGN PATENT DOCUMENTS

WO    2019241025 A1    12/2019

OTHER PUBLICATIONS

"Add formulas & Functions", Retrieved From https://web.archive.org/web/20190227013136/https:/support.google.com/docs/answer/46977?co=GENIE.Platform%3DDesktop&hl=en, Feb. 27, 2019, 3 pages.

(Continued)

*Primary Examiner* — Laurie A Ries
(74) *Attorney, Agent, or Firm* — NovoTechIP International PLLC

(57) ABSTRACT

An electronic system and method of operating electronic software applications such as spreadsheets provides help with formulas and other software functions. The system provides the user with a list of model examples upon request, and responds to a user selection of a model by creating both a model formula or control and model data upon which the formula or control is calculated or may act. The model is editable by the user, so that they may better understand the function being illustrated and use it with their own data.

18 Claims, 11 Drawing Sheets

(56) References Cited

U.S. PATENT DOCUMENTS

| | | | |
|---|---|---|---|
| 2007/0061369 A1 | 3/2007 | Viegers et al. | |
| 2007/0220415 A1* | 9/2007 | Cheng | G06F 40/18 715/212 |
| 2007/0244672 A1* | 10/2007 | Kjaer | G06F 40/18 703/2 |
| 2007/0250523 A1* | 10/2007 | Beers | G06F 30/00 |
| 2012/0042242 A1* | 2/2012 | Garland | G06F 40/111 715/256 |
| 2013/0151938 A1* | 6/2013 | Waldman | G06F 40/18 715/210 |
| 2014/0149838 A1* | 5/2014 | Bedard | G06F 40/18 715/217 |
| 2014/0372854 A1 | 12/2014 | Otero et al. | |
| 2018/0239748 A1 | 8/2018 | Zhang et al. | |
| 2019/0189110 A1* | 6/2019 | Chintalapati | G06F 40/14 |
| 2020/0150938 A1* | 5/2020 | Stachura | G06F 8/38 |

OTHER PUBLICATIONS

Bruns, Dave, "29 Ways to Save time with Excel Formulas", Retrieved From: https://exceljet.net/29-ways-to-save-time-with-excel-formulas, Retrieved on: Dec. 2, 2019, 25 Pages.

Jose Maria, Delos Santos, "Smartsheet Announces Addition of Cross-Sheet Formulas", Retrieved From https://project-management.com/smartsheet-announces-addition-of-cross-sheet-formulas/, Mar. 3, 2018, 11 Pages.

"International Search Report and the Written Opinion Issued in PCT Application No. PCT/US2021/014251", dated May 7, 2021, 13 Pages.

* cited by examiner

/ 702

Birthday List

Edward Ivey  19/10/23
Ana Haase   94/10/1
Kenneth Westley   46/10/20
Ada Clark    96/3/28
Thelma Johnson   70/2/11
Joshua Paul  60/5/31
Annette Black    42/8/19
Abdul-Majid Totah   63/7/24
Mathilde Bech    57/6/22
Driss Nieuwstraten  64/1/24
Elizabeth Williams  57/6/21

Fig. 8

IN-APPLICATION EXAMPLE LIBRARY

TECHNICAL FIELD

The present application is directed to systems and methods of providing examples to a user of a software application, and in particular to methods of displaying examples based on example data to a user without requiring the user to navigate away from the software application.

BACKGROUND

Present day software applications provide powerful tools for automating calculations, formatting, and presentation of data. Spreadsheet applications, for example, allow not only tracking and tabulation of income and expenses, but are also widely used for financial modeling and scientific data analysis. This computing power is based in part on the large number of functions that are available in spreadsheet applications. A drawback of this power is that it can become difficult for users to remember the exact syntax and usage of functions. "Help" resources are available within many spreadsheet and other applications, but these resources often do not help users work with their own data very effectively. Users often resort to internet searches and to downloading example files in order to implement their calculations, potentially exposing users to viruses and risking errors in formulas that are copied without being understood. A need remains for better methods of helping users construct formulas and perform other software tasks without having to leave the application environment.

SUMMARY

In one aspect, an electronic spreadsheet system for storing and manipulating information includes a processor, and machine-readable media including instructions. The instructions, when executed by the processor, cause the processor to display on a display device a spreadsheet application including a tool bar and a worksheet window configured to display a plurality of worksheet pages including a first worksheet page having a first page identifier, each worksheet page including data arranged in rows and columns of a grid and configured to be manipulated and used in calculations, to receive within the spreadsheet application a request from a user for a model, responsive to the received request, to present a list of model types to the user within the spreadsheet application, to receive a selection of a model type from the presented list from the user within the spreadsheet application, to generate a second worksheet page responsive to the selected model type including a second worksheet page identifier appearing adjacent to the first worksheet page identifier, and to display at least a portion of a model of the selected model type on the second worksheet page to the user within the spreadsheet application, wherein the model includes model data and a model formula using the model data, the model formula being editable by the user.

In another aspect, a method of operating an electronic spreadsheet application including a window configured to display a plurality of worksheet pages including a first worksheet page having a first page identifier, each worksheet page including data arranged in rows and columns of a grid and configured to be manipulated and used in calculations, includes receiving a user request for a model within the spreadsheet application, responsive to the received request, presenting a list of model types to the user within the spreadsheet application, receiving a user selection of a model type from the presented list within the spreadsheet application, generating a second worksheet page responsive to the selected model type including a second worksheet page identifier appearing adjacent to the first worksheet page identifier, and displaying at least a portion of a model of the selected model type on the second worksheet page to the user within the spreadsheet application, wherein the model includes model data and a model formula using the model data, the model formula being editable by the user.

In another aspect, an electronic system for storing and manipulating electronic documents includes a processor and machine-readable media including instructions. The instructions, when executed by the processor, cause the processor to display on a display device a software application including an application window, to receive within the software application a request from a user for a model, responsive to the received request, to present a list of model types to the user within the software application, to receive a selection of a model type from the presented list from the user within the software application, and to display at least a portion of a model of the selected model type to the user within the software application, wherein the model includes model data and a model control using the model data, the model control being editable by the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 8 shows the results of the wildcard search model shown in FIG. 7.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Spreadsheet applications such as Microsoft Excel®, SmartSheet®, or Google Sheets® are powerful tools for expert users but are also accessible to novices who need to perform simpler tasks. However, problems may arise when the latter group of users begin to try to access more complicated functions and tools, but have difficulty in understanding their usage and syntax. Other software applications may have similar issues of providing functionality to "power users" while still allowing more casual users to perform more basic tasks. The systems and methods described herein provide a bridge as users move from the "casual user" group to the "power user" group, by providing hands-on help with difficult functions including both correct usage and correct syntax without requiring the users to leave the application to search for example user or to access training classes or the like.

In the first example described below, the system is described in the context of a spreadsheet application. When a user requires help with a function beyond simply reading a description, the application can provide a working example (a model) of the function using model data, both of which are inserted into the user spreadsheet. By seeing a correctly formatted example of a formula using the function using model data that can be edited, the user can experiment with adjusting the model data and the formula to gain a deeper understanding of how to use it correctly. In the second example described below, a similar help function is provided for learning to accomplish a word processing task.

Figure 1:
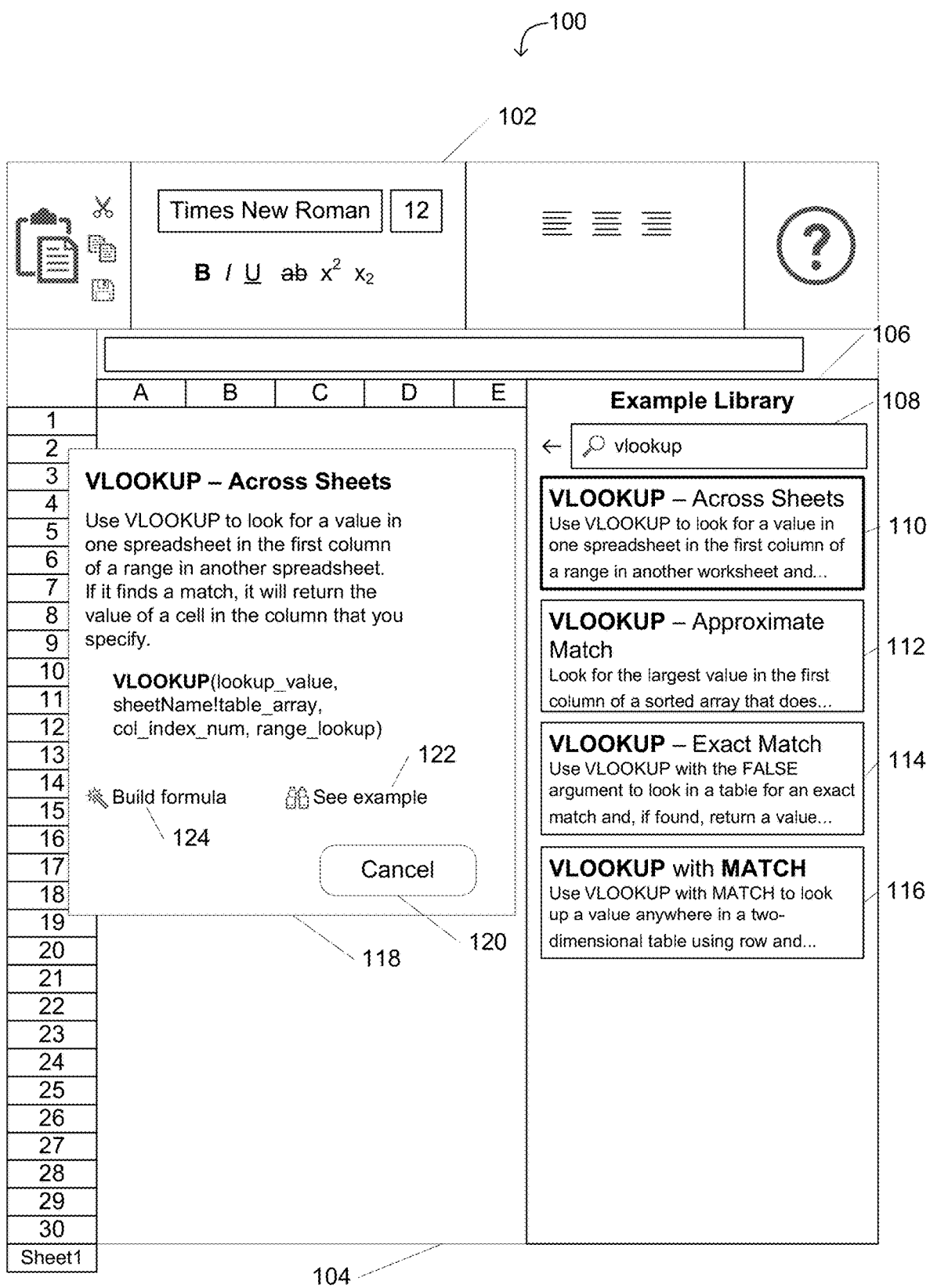
FIG. 1 shows a user interface ("UP") for selecting a model within a spreadsheet.

FIG. 1 shows an example user interface (UI) 100 for selecting a model (an example) in a spreadsheet. The spreadsheet application includes a tool bar 102 and a worksheet window 104 configured to display one or more worksheet pages, each worksheet page including data arranged in rows and columns of a grid and configured to be manipulated and used in calculations. The user has opened the Example Library 106 shown at the right of the figure and has searched for the function "vlookup" using search box 108. The library 106 contains four matching entries: "VLOOKUP—Across Sheets" 110, "VLOOKUP—Approximate Match" 112, "VLOOKUP—Exact Match" 114, and "VLOOKUP with MATCH" 118. Each of boxes 110, 112, 114, 118 shows the beginning of a library entry. It will be understood that these are merely illustrative examples, and that other functions and models may be chosen depending on the implementation and the expected level of user sophistication. In the illustrated implementation, help has been organized by function, but in other implementations, help may be organized in other ways, for example by common user tasks (e.g., summing columns in a table, counting entries that match a particular rule, changing formatting rules for cells according to their contents, creating charts, formatting cells such as foreign currency or dates, or creating animations such as for a presentation). The example library may include not only single-function entries, but entries describing how to use multiple functions together to accomplish a task, as seen in box 118.

The user has selected "VLOOKUP—Across Sheets" 110, and the full description of the example is displayed to the user in help box 118. If the expanded description shown in help box 118 is sufficient for the user to use the function successfully, they may press the "Cancel" button 120 and exit at this point. Otherwise, the user may decide that while the correct function has been located, they are still unsure about how to use it correctly. In such cases, the user may select the "See example" button 122 in order to see a "live" example, as shown below in FIG. 2 and FIG. 3. The "see example" window may also provide a way for the user to interact and experiment with the formula without altering the file, as discussed further below. Alternatively, the user may select the "Build formula" button 124 to go to a dialog box that helps them create the formula, as seen below in FIG. 4.

Figure 2:
FIG. 2 shows a spreadsheet page created by the UI of FIG. 1 containing the selected model formula.

In the illustrated implementation of FIG. 2, the user is using a spreadsheet application such as Microsoft Excel®, and the model is added as one or more new sheets in the document (viewable as "tabs" 202, 204, 206 at the bottom of FIG. 2). The illustrated implementations of FIG. 2 has the advantage that when the user is done viewing and working with the example formula and data, the inserted new sheet(s) 204, 206 can be deleted without disturbing user data, but in other implementations, it may be preferred to open the model a new separate document or to place it among the user's work in the current document.

Figure 3:
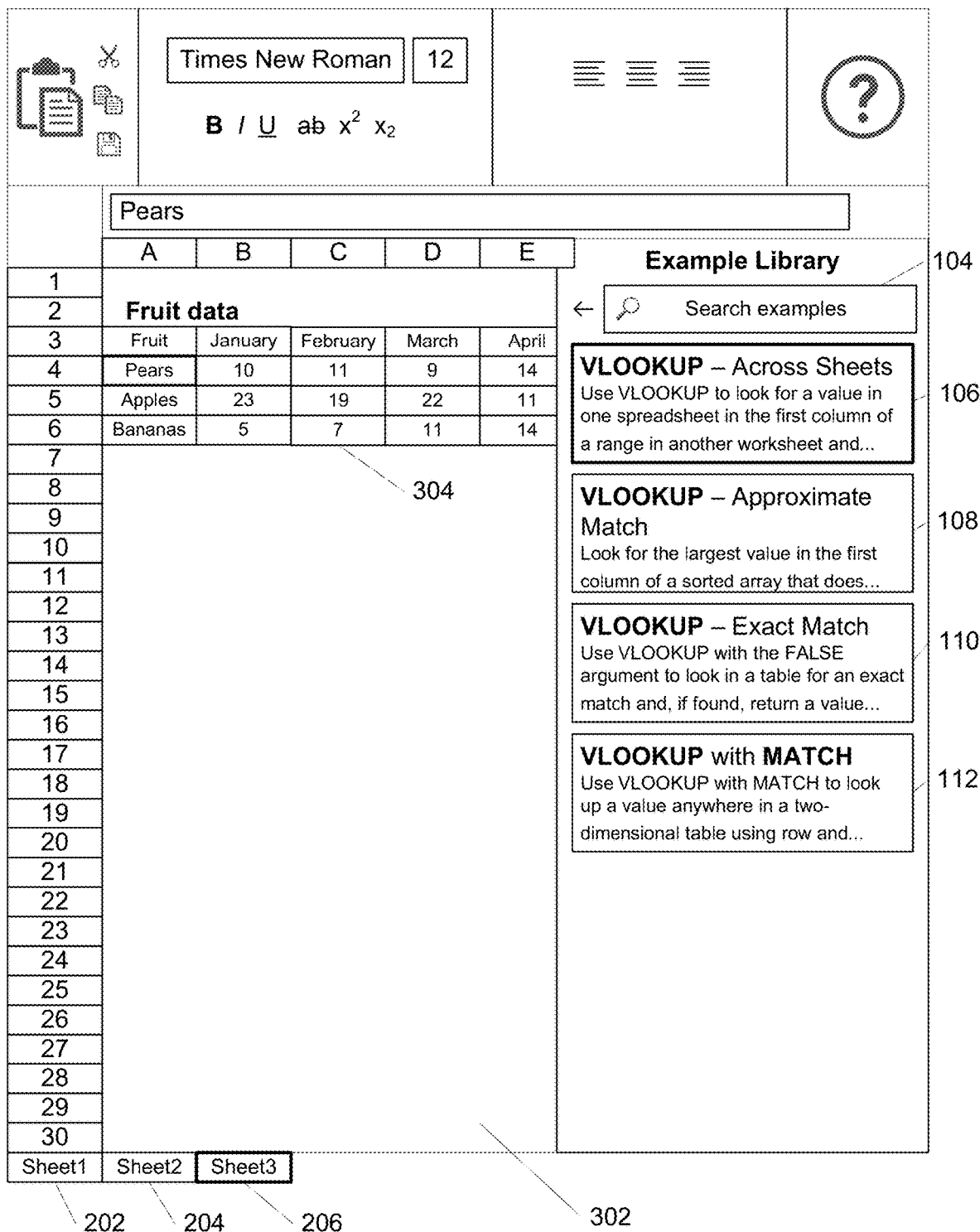
FIG. 3 shows a spreadsheet page created by the UI of FIG. 1 containing the underlying data for the formula shown in FIG. 2.

FIG. 2 shows a first sheet 208 of two sheets created within the user document, and FIG. 3 shows the second sheet 302. (There are two sheets in this illustrated model because it is a description of using VLOOKUP across multiple sheets. In other implementations, both data and function may be placed in the same sheet.) The sheet depicted in FIG. 2 includes narrative text describing the VLOOKUP function 210, and also a working model formula including the VLOOKUP function. The output of the model formula is visible in box 212, and the text of the model formula is shown at the top of the page in box 214. The data upon which this formula is based is shown in "Sheet3," and the reference to the data may be seen in formula text 214 as "Sheet3!A2:M5"). FIG. 3 shows second sheet 302. This sheet includes model data 304 for use by model formula 214. The user may use the combination of data in sheet 302 and formula in sheet 208 to understand how the VLOOKUP function works in the context of looking up data on other sheets. Since the model formula 214 and the model data 304 are fully editable by the user, the user may change values in the formula or data as an aid to understanding the working of the function. This experimentation may be performed without disturbing the user-created data on other sheets of the document, reducing the risk of spoiling the user's data before they understand the correct format and usage for the function.

Figure 4:
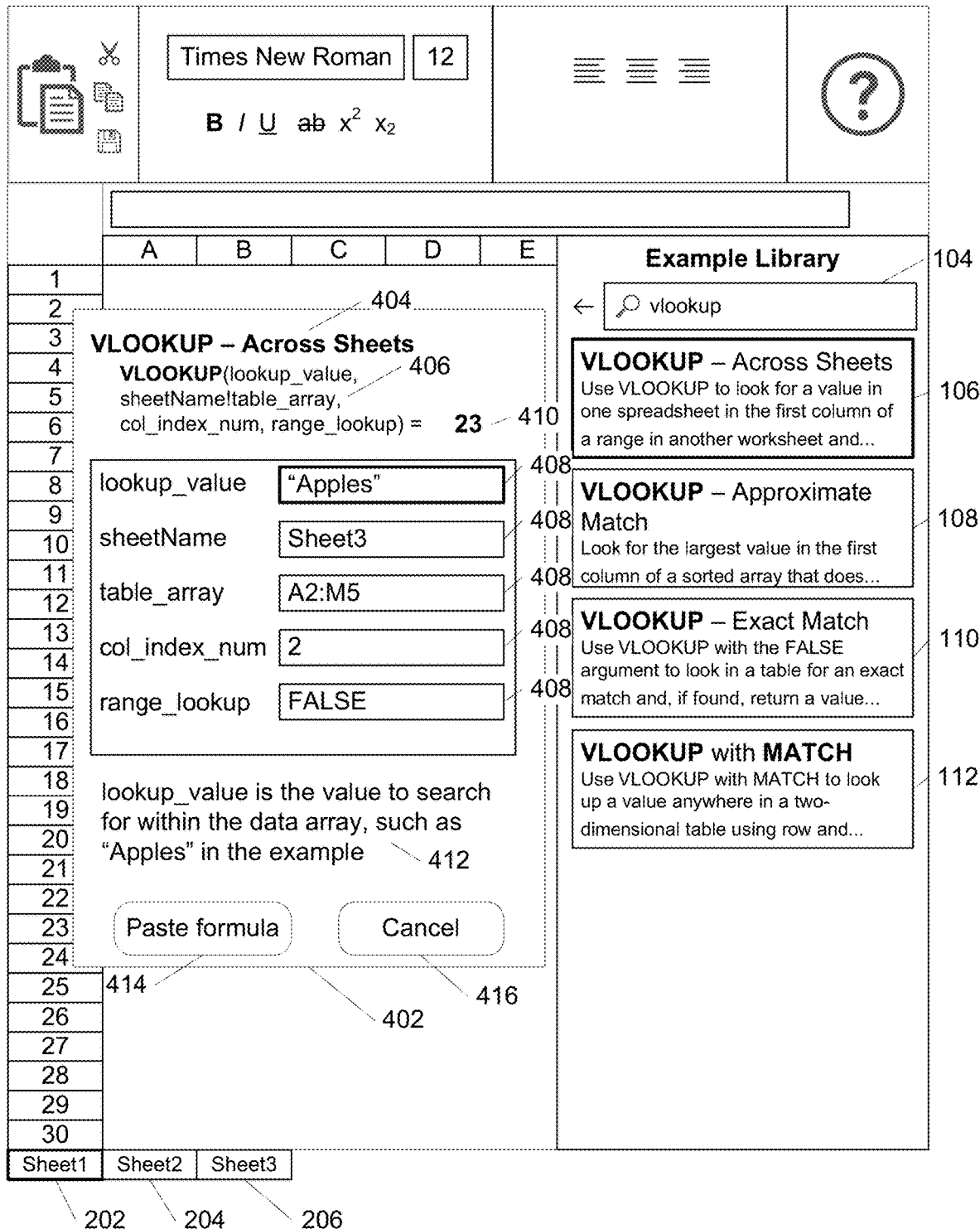
FIG. 4 shows a "formula builder" window that allows a user to substitute their own data for model formula data.

FIG. 4 shows the window accessed by the "Build formula" control 124 shown in FIG. 1. In some implementations, this window may also be accessed after the model has been placed in the user's worksheet as discussed above, for example by using a toolbar button or the like to reach the "Build formula" functionality. In the illustrated embodiment, the "Build formula" dialog box 402 includes the name of the example 404, the correct syntax for the example 406, text boxes 408 for entering the inputs to the model formula, and the value 410 of the formula with the currently entered inputs (if the inputs are valid). As illustrated in FIG. 4, text boxes 408 are prepopulated with the values for the inputs as shown in the model formula depicted in FIG. 2. In other implementations, these boxes may not all be prepopulated, or may be populated with the system's best attempts to identify the most likely information for the boxes in the user worksheet, as further discussed below. Below text boxes 408, explanatory text 412 for the selected box is displayed, explaining the usage of the "lookup value" parameter. As illustrated, the usage includes a reference to the specific example being worked with to help the user understand the parameter, but in other implementations, this information may be omitted. It will be noted that text boxes 408 do not simply display a list of the comma-separated inputs for the VLOOKUP function, but that they display "sheetName" and "table_array" in separate boxes even though these two inputs are combined into one argument in the VLOOKUP function syntax 404. This separation is an example of how the depicted implementation helps the user avoid syntax errors while building the function.

When the user has filled in text boxes 408 with the desired values or formulas, the "Paste formula" button 414 allows them to paste the resulting function into their spreadsheet, while the "Cancel" button 416 allows them to leave the dialog box without making changes to the spreadsheet.

As mentioned above, in some implementations, the formula builder or other components of the systems described herein may attempt to prepopulate formula inputs with information from an actual user worksheet, instead of from prebuilt examples. These implementations represent a difficult problem that may require significant machine intelligence to fully implement, but simpler solutions are possible in some cases. For example, if the user has begun typing a formula before accessing the "Formula builder" window shown in FIG. 4, text boxes 408 may be prepopulated with whatever information the user previously typed. If the user worksheet includes only one named two-dimensional array, or if a two-dimensional area of the worksheet is selected when the user chooses "Formula builder," the system may assume that this array name represents the data that the user will wish to search and may populate it into the "table_array" box. The boxes may also be prepopulated with values that were previously used by the user the last time this function (or a similar function using some of the same arguments) was used.

Figure 5:
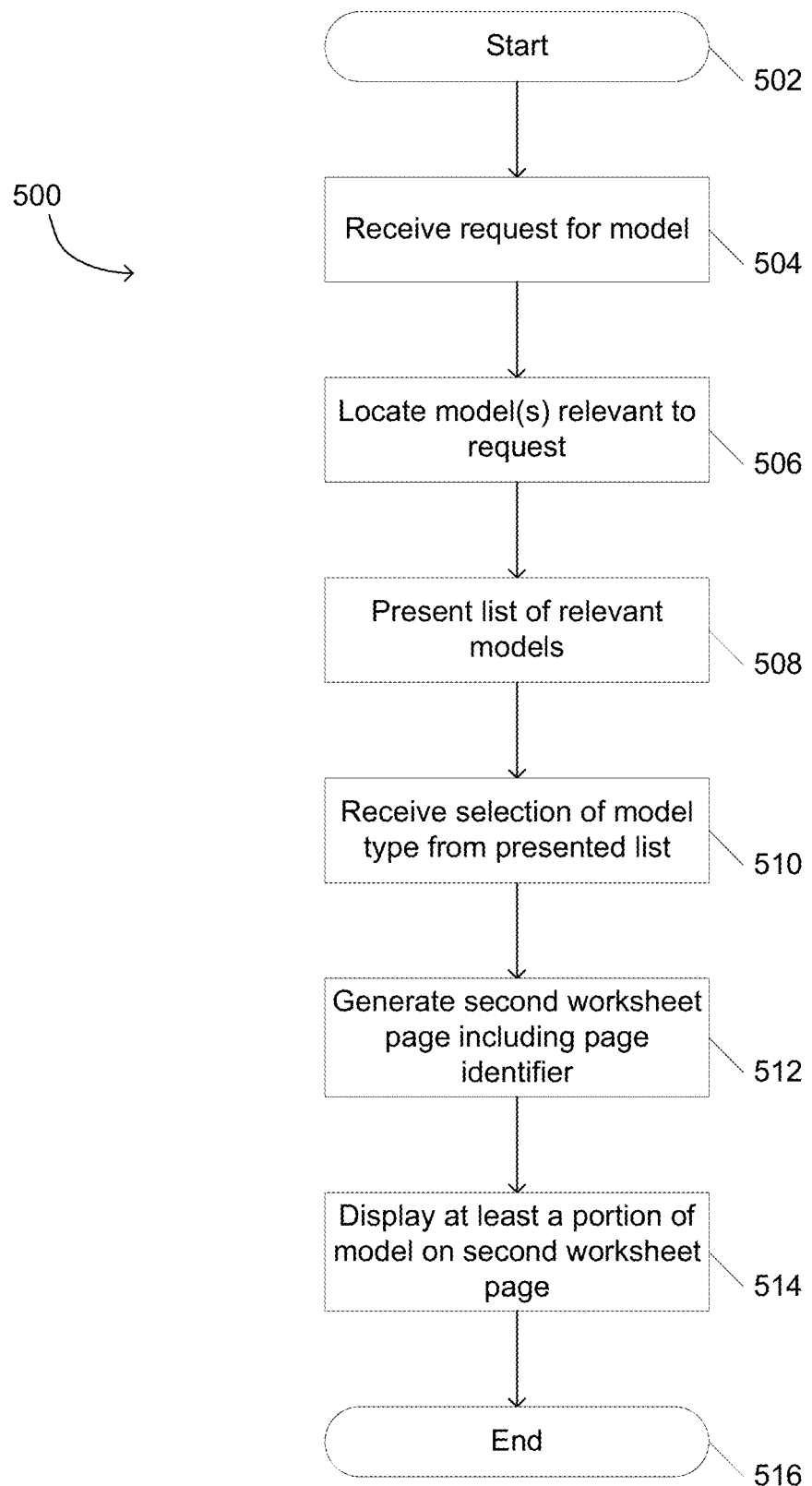
FIG. 5 shows a flow diagram of a method of operating a spreadsheet application.

FIG. 5 is a flow diagram 500 showing a method of operating an electronic spreadsheet application as discussed above. The application starts in normal operation with a user (step 502). Eventually, it may receive a request from the user for a model (step 504). This request may come, for example, via a user interface such as a search box, a help button, a menu selection, a toolbar icon, or a tooltip displayed while entering a formula. The application searches its model (example) library to locate one or more models relevant to the request (step 506), and presents them to the user (step 508), for example in a dialog box as shown in FIG. 1-FIG. 4 including the list and a description of a use case for each model. The model library may be sorted by function, by task, or by any other convenient characteristic, and may include key words or similar elements to help the user in searching for the best model for the task at hand.

The user selects a model from the presented list, and the application receives that selection (step 510). The application then generates at least a second worksheet page (and optionally a third or more) (step 512). Finally, it displays at least a portion of the chosen model on the generated second worksheet page (step 514). As discussed above, both the model formula and the model data may be placed on the same generated worksheet page, or they may be separated into multiple sheets as shown in FIG. 1-FIG. 4. The application may further provide a user interface that includes controls for substituting user data for model data in the model formula, as shown in FIG. 4. Finally, the operational method ends (step 516), allowing the user to explore the generated worksheet page(s) to learn about the model.

Figure 6:
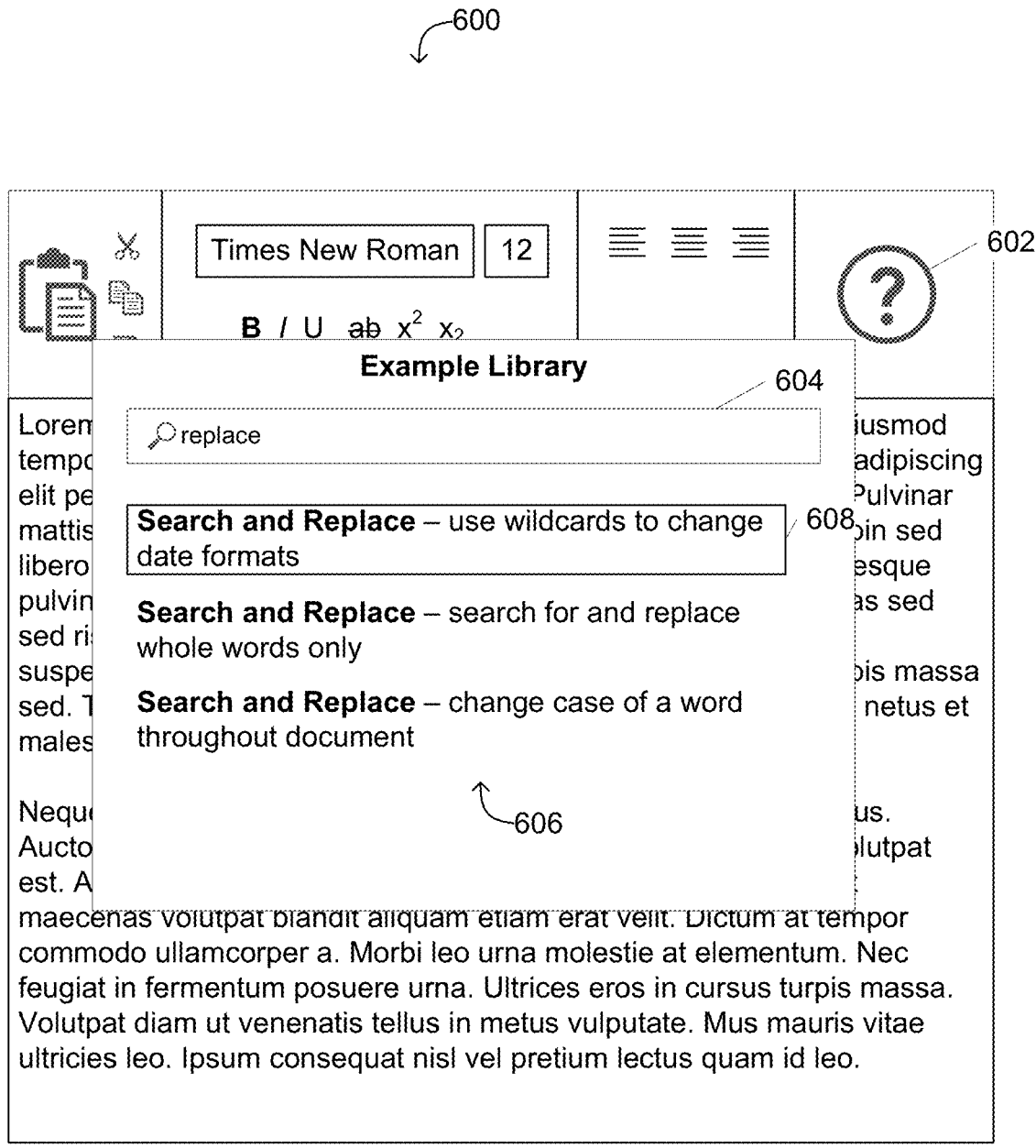
FIG. 6 shows a UI for selecting a model in a word processing application.
Figure 7:
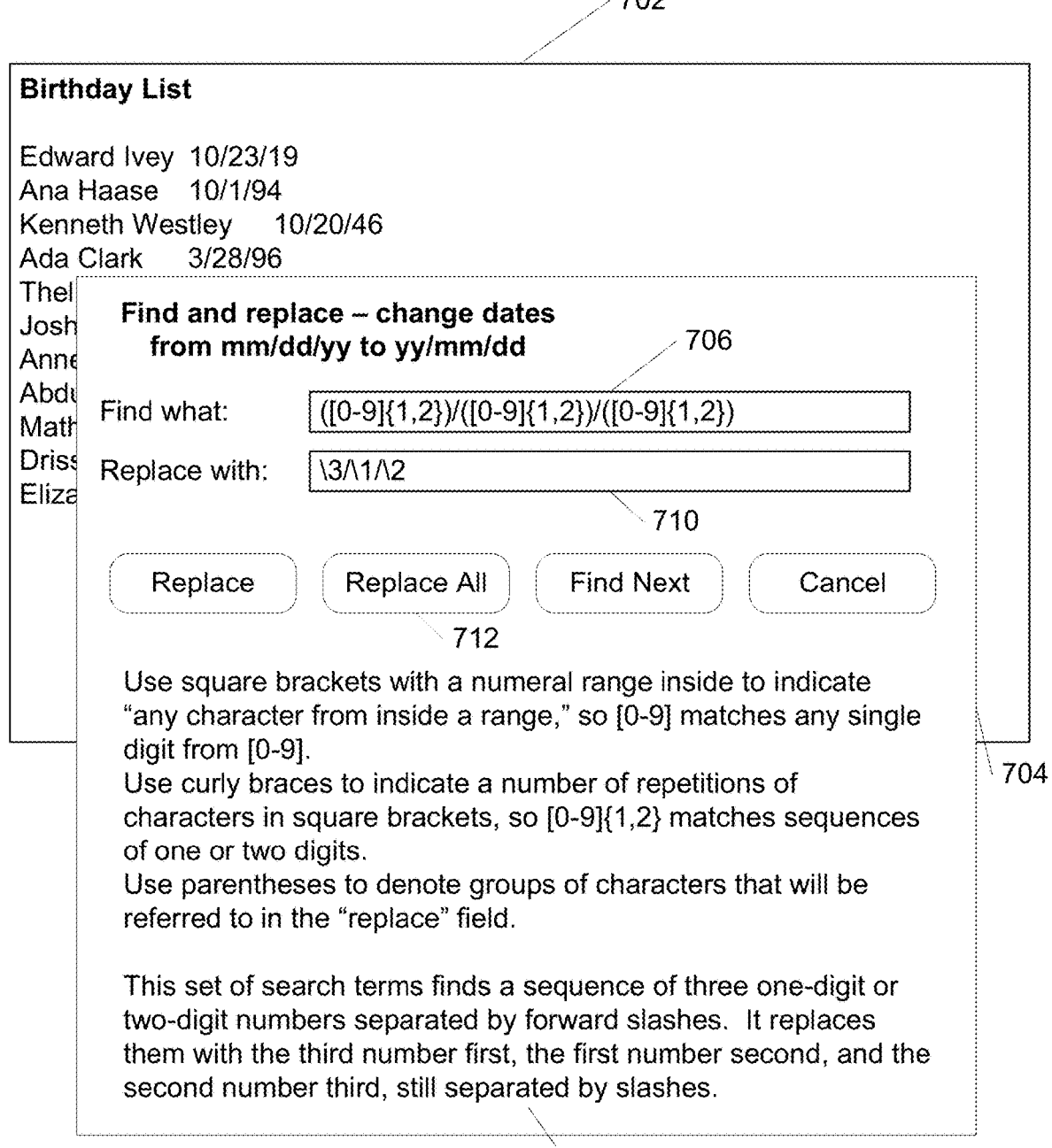
FIG. 7 shows a model for doing a wildcard search in a word processing application.

FIG. 6 shows a user word processing document 600. The user would like to do a search and replace on the document to replace 5-letter words ending in "m" with the same words ending in "n". They click on the help icon 602 and types "replace" into search bar 604. The system gives him a menu 606 of choices. While none of them are exactly what the user wants, they believe that it may be related to wildcards, so they select the first option 608. In response, the system creates document 702 and dialog box 704 shown in FIG. 7. Document 702 is titled "Birthday List" and is a list of names and dates in mm/dd/yy format.

Figure 9:
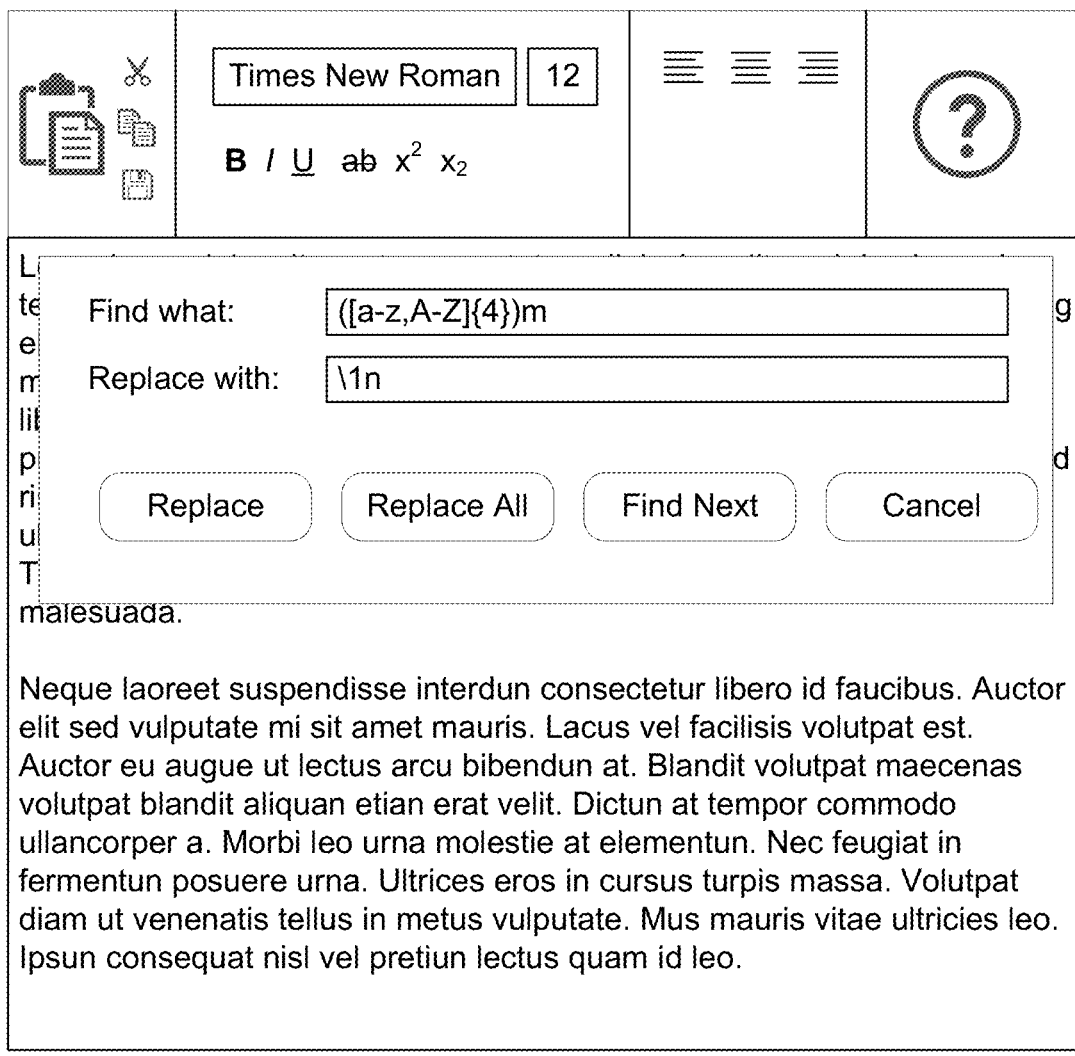
FIG. 9 shows a user-created wildcard search using the principles learned from the model of FIG. 7.

Viewing dialog box 704, the user can see how search and replace using specific characters is implemented. The "find" character sequence 706 is explained in text block 708 at the bottom of the dialog box. Although it looks complicated, the user can use the text to see that it finds three 1-digit or 2-digit numbers separated by "\" characters. The "replace" character sequence 710 explains how to reorder these numbers to change the date format. When the user clicks the "Replace All" button 712, document 702 is reformatted as shown in FIG. 8, with the dates changed to yy/mm/dd format, but the names unchanged. They may then use this knowledge to do a similar text-based search and replace on their original document as shown in FIG. 9.

It will be understood that while the example described above related to the search and replace word processor function, other functions may be similarly addressed. For example, the help system might demonstrate for the user how to create a table of a certain size, how to define styles in a document, or how to set up and execute a mail merge. Each of these functionalities represents a capability that is accessible to "power users" of the word processing software, but can remain opaque to intermediate level users. By providing working models that the user can actually manipulate and change, along with explanations of how the models work, the system described herein helps bridge the gap for these users to access the more difficult-to-understand functions of their software.

Figure 10:
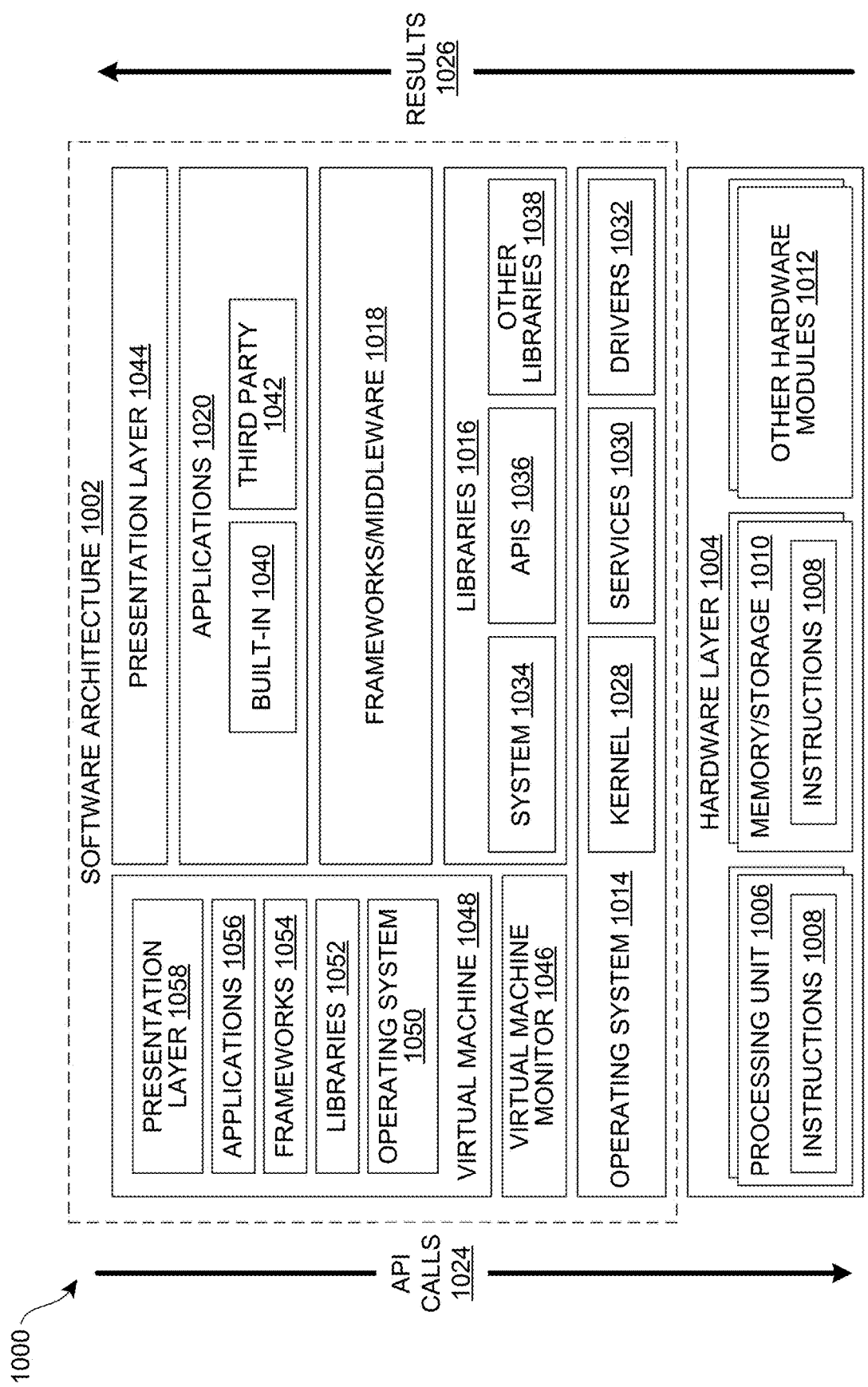
FIG. 10 is a block diagram of an example computing device, which may be used to provide implementations of the systems and methods described herein.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture and it will be appreciated that many other architectures may be implemented to facilitate the functionality described herein. The software architecture 1002 may execute on hardware that may include, among other things, document storage, processors, memory, and input/output (I/O) components. A representative hardware layer 1004 is illustrated and can represent, for example, the devices described herein. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1008 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine. The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
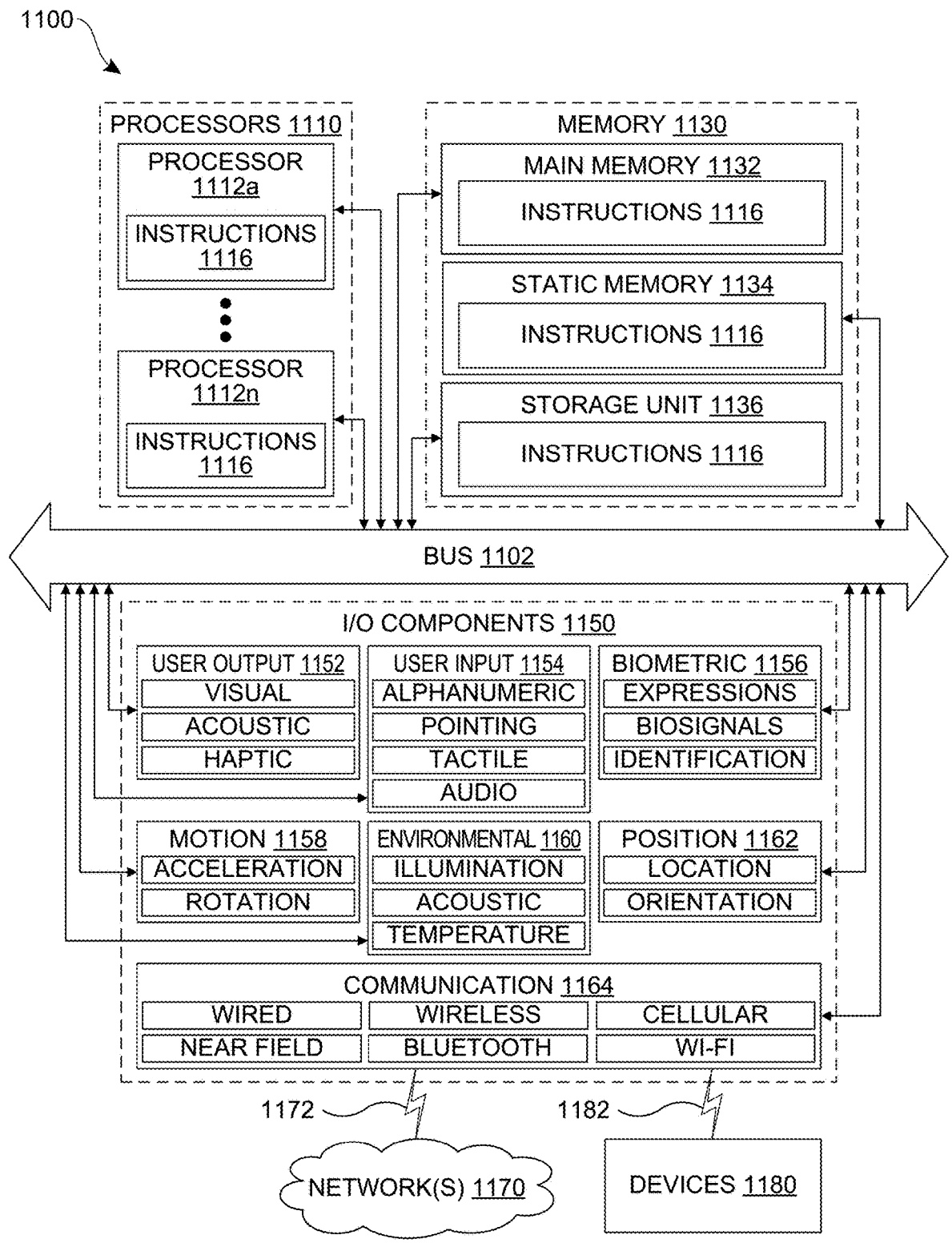
FIG. 11 is a block diagram illustrating components of an example machine configured to read instructions from a machine-readable medium.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156 and/or position components 1162, among a wide array of other environmental sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1: An electronic spreadsheet system for storing and manipulating information, the electronic spreadsheet system comprising a processor and machine-readable media including instructions. The instructions, when executed by the processor, cause the processor to display on a display device a spreadsheet application including a tool bar and a worksheet window configured to display a plurality of worksheet pages including a first worksheet page having a first page identifier, each worksheet page including data arranged in rows and columns of a grid and configured to be manipulated and used in calculations; to receive within the spreadsheet application a request from a user for a model; responsive to the received request, to present a list of model types to the user within the spreadsheet application; to receive a selection of a model type from the presented list from the user within the spreadsheet application; to generate a second worksheet page responsive to the selected model type including a second worksheet page identifier appearing adjacent to the first worksheet page identifier; and to display at least a portion of a model of the selected model type on the second worksheet page to the user within the spreadsheet application, wherein the model includes model data and a model formula using the model data, the model formula being editable by the user.

Item 2: The electronic spreadsheet system of item 1, wherein the machine-readable media further include instructions which, when executed by the processor, cause the processor to receive the request for a model via a control selected from the list consisting of a search box, a help button, a menu selection, and a toolbar icon.

Item 3: The electronic spreadsheet system of item 1 or 2, wherein the machine-readable media further include instructions which, when executed by the processor, cause the processor to present the list of model types in a dialog box including the list and a description of a use case for each model type.

Item 4: The electronic spreadsheet system of any of items 1-3, wherein the machine-readable media further include instructions which, when executed by the processor, cause the processor to display both the model data and the model formula on the second worksheet page.

Item 5: The electronic spreadsheet system of any of items 1-4, wherein the machine-readable media further include instructions which, when executed by the processor, cause the processor to create a third worksheet page including a third worksheet page identifier appearing adjacent to the first worksheet page identifier or to the second worksheet page identifier, wherein the model formula is placed on the second worksheet page and the model data is placed on the third worksheet page.

Item 6: The electronic spreadsheet system of any of items 1-5, wherein the machine-readable media further include instructions which, when executed by the processor, cause the processor to present the list of model types by providing model types that include a function specified by the user in the received request.

Item 7: The electronic spreadsheet system of any of items 1-6, wherein the machine-readable media further include instructions which, when executed by the processor, cause the processor to present the list of model types by providing model types that correspond to a task specified by the user in the received request.

Item 8: The electronic spreadsheet system of any of items 1-7, wherein the machine-readable media further include instructions which, when executed by the processor, cause the processor to provide a user interface that includes controls for substituting user data for model data in the model formula.

Item 9: A method of operating an electronic spreadsheet application including a window configured to display a plurality of worksheet pages including a first worksheet page having a first page identifier, each worksheet page including data arranged in rows and columns of a grid and configured to be manipulated and used in calculations. The method includes receiving a user request for a model within the spreadsheet application; responsive to the received request, presenting a list of model types to the user within the spreadsheet application; receiving a user selection of a model type from the presented list within the spreadsheet application; generating a second worksheet page responsive to the selected model type including a second worksheet page identifier appearing adjacent to the first worksheet page identifier; and displaying at least a portion of a model of the selected model type on the second worksheet page to the user within the spreadsheet application, wherein the model includes model data and a model formula using the model data, the model formula being editable by the user.

Item 10: The method of item 9, wherein receiving a user request for a model includes receiving the request via a control selected from the list consisting of a search box, a help button, a menu selection, and a toolbar icon.

Item 11: The method item 9 or 10, wherein presenting the list of model types includes presenting the list in a dialog box including the list and a description of a use case for each model type.

Item 12: The method of any of items 9-11, wherein displaying at least a portion of the model includes displaying both the model data and the model formula on the second worksheet page.

Item 13: The method of any of items 9-12, further including creating a third worksheet page including a third worksheet page identifier appearing adjacent to the first worksheet page identifier or to the second worksheet page identifier, wherein displaying at least a portion of the model includes placing the model formula on the second worksheet page and the model data on the third worksheet page.

Item 14: The method of any of items 9-13, wherein presenting a list of model types includes presenting the list by providing model types that include a function specified by the user in the received request.

Item 15: The method of any of items 9-14, wherein presenting a list of model types includes presenting the list by providing model types that correspond to a task specified by the user in the received request.

Item 16: The method of any of items 9-15, further including providing a user interface that includes controls for substituting user data for model data in the model formula.

Item 17: An electronic system for storing and manipulating electronic documents, the electronic system comprising a processor and machine-readable media including instructions. The instructions, when executed by the processor, cause the processor to display on a display device a software application including an application window; to receive within the software application a request from a user for a model; responsive to the received request, to present a list of model types to the user within the software application; to receive a selection of a model type from the presented list from the user within the software application; and to display at least a portion of a model of the selected model type to the user within the software application, wherein the model includes model data and a model control using the model data, the model control being editable by the user.

Item 18: The electronic system of item 17, wherein the software application is a word processing application.

Item 19: The electronic system of item 17 or 18, wherein the model control is a wildcard search string.

Item 20: The electronic system of any of items 17-19, wherein the machine-readable media further include instructions which, when executed by the processor, cause the processor to add the at least a portion of the model to a user document within the software application.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An electronic spreadsheet system for storing and manipulating information, the electronic spreadsheet system comprising:
   a processor; and
   machine-readable media including instructions which, when executed by the processor, cause the processor to:
      display on a display device a spreadsheet application including a tool bar and a worksheet window configured to display a plurality of worksheet pages including a first worksheet page having a first page identifier, each worksheet page including data arranged in rows and columns of a grid and configured to be manipulated and used in calculations;
      receive within the spreadsheet application a request from a user for a model;
      responsive to the received request, present a list of model types to the user within the spreadsheet application in a dialog box including the list and a description of a use case for each model type;
      receive a selection of a model type from the presented list from the user within the spreadsheet application;
      generate a second worksheet page responsive to the selected model type including a second worksheet page identifier appearing adjacent to the first worksheet page identifier; and
      display at least a portion of a model of the selected model type on the second worksheet page to the user within the spreadsheet application, wherein the model includes:
         model data; and
         a model formula using the model data, the model formula being editable by the user.

2. The electronic spreadsheet system of claim 1, wherein the machine-readable media further include instructions which, when executed by the processor, cause the processor to receive the request for a model via a control selected from the list consisting of a search box, a help button, a menu selection, and a toolbar icon.

3. The electronic spreadsheet system of claim 1, wherein the machine-readable media further include instructions which, when executed by the processor, cause the processor to display both the model data and the model formula on the second worksheet page.

4. The electronic spreadsheet system of claim 1, wherein the machine-readable media further include instructions which, when executed by the processor, cause the processor to create a third worksheet page including a third worksheet page identifier appearing adjacent to the first worksheet page identifier or to the second worksheet page identifier, wherein the model formula is placed on the second worksheet page and the model data is placed on the third worksheet page.

5. The electronic spreadsheet system of claim 1, wherein the machine-readable media further include instructions which, when executed by the processor, cause the processor to present the list of model types by providing model types that include a function specified by the user in the received request.

6. The electronic spreadsheet system of claim 1, wherein the machine-readable media further include instructions which, when executed by the processor, cause the processor to present the list of model types by providing model types that correspond to a task specified by the user in the received request.

7. The electronic spreadsheet system of claim 1, wherein the machine-readable media further include instructions which, when executed by the processor, cause the processor to provide a user interface that includes controls for substituting user data for model data in the model formula.

8. A method of operating an electronic spreadsheet application including a window configured to display a plurality of worksheet pages including a first worksheet page having a first page identifier, each worksheet page including data arranged in rows and columns of a grid and configured to be manipulated and used in calculations, the method comprising:
receiving a user request for a model within the spreadsheet application;
responsive to the received request, presenting a list of model types to the user within the spreadsheet application in a dialog box including the list and a description of a use case for each model type;
receiving a user selection of a model type from the presented list within the spreadsheet application;
generating a second worksheet page responsive to the selected model type including a second worksheet page identifier appearing adjacent to the first worksheet page identifier; and
displaying at least a portion of a model of the selected model type on the second worksheet page to the user within the spreadsheet application, wherein the model includes:
model data; and
a model formula using the model data, the model formula being editable by the user.

9. The method of claim 8, wherein receiving a user request for a model includes receiving the request via a control selected from the list consisting of a search box, a help button, a menu selection, and a toolbar icon.

10. The method of claim 8, wherein displaying at least a portion of the model includes displaying both the model data and the model formula on the second worksheet page.

11. The method of claim 8, further comprising creating a third worksheet page including a third worksheet page identifier appearing adjacent to the first worksheet page identifier or to the second worksheet page identifier, wherein displaying at least a portion of the model includes placing the model formula on the second worksheet page and the model data on the third worksheet page.

12. The method of claim 8, wherein presenting a list of model types includes presenting the list by providing model types that include a function specified by the user in the received request.

13. The method of claim 8, wherein presenting a list of model types includes presenting the list by providing model types that correspond to a task specified by the user in the received request.

14. The method of claim 8, further comprising providing a user interface that includes controls for substituting user data for model data in the model formula.

15. An electronic system for storing and manipulating electronic documents, the electronic system comprising:
a processor; and
machine-readable media including instructions which, when executed by the processor, cause the processor to:
display on a display device a software application including an application window;
receive within the software application a request from a user for a model;
responsive to the received request, present a list of model types to the user within the software application in a dialog box including the list and a description of a use case for each model type;
receive a selection of a model type from the presented list from the user within the software application; and
display at least a portion of a model of the selected model type to the user within the software application, wherein the model includes:
model data; and
a model control using the model data, the model control being editable by the user.

16. The electronic system of claim 14, wherein the software application is a word processing application.

17. The electronic system of claim 14, wherein the model control is a wildcard search string.

18. The electronic system of claim 14, wherein the machine-readable media further include instructions which, when executed by the processor, cause the processor to add the at least a portion of the model to a user document within the software application.

* * * * *